United States Patent
Lukitsh

[11] 3,792,620
[45] Feb. 19, 1974

[54] INFINITELY VARIABLE ROTATIONAL SPEED TRANSMITTING DEVICE

[76] Inventor: Emery J. Lukitsh, 10 S. 151 Wileden, Naperville, Ill. 60540

[22] Filed: Aug. 14, 1972

[21] Appl. No.: 280,213

[52] U.S. Cl. .................................................. 74/200
[51] Int. Cl. ............................................ F16h 15/08
[58] Field of Search .... 74/192, 200, 230.17 A, 201, 74/199

[56] References Cited
UNITED STATES PATENTS
2,555,079  5/1951  Giorgi .................................. 74/201

Primary Examiner—Leonard H. Gerin
Assistant Examiner—Allan Russell Burke
Attorney, Agent, or Firm—Merriam, Marshall, Shapiro & Klose

[57] ABSTRACT

The present invention provides a low cost, versatile rotational speed changing and transmitting device which operates by transmission of power from conical input disks to a centrally located movable idler disk to conical output disks for transmission to an output shaft, the position of the idler disk determining the output speed.

6 Claims, 2 Drawing Figures

INFINITELY VARIABLE ROTATIONAL SPEED TRANSMITTING DEVICE

BACKGROUND OF THE INVENTION

The present invention relates generally to variable speed rotational transmissions and more specifically to low-cost infinitely variable rotational speed transmitting devices.

Often it is necessary to change the speed of rotation of a shaft to a speed which is more suitable for a particular use. This may be accomplished by utilizing a wide variety of gearing mechanisms. However, there may be disadvantages associated with the use of gears to alter rotational speed, since the resulting output speeds can of necessity only be fractions or multiples of the input speed.

For many applications infinitely variable speed control is necessary. Such speed controls find a wide variety of applications, including, inter alia, use in machine tools, such as spindles for grinders, drill presses, milling machines or use in electric cars or plant maintenance vehicles.

The prior art has sought infinite variation in rotational output speed by the use of a wide variety of apparatuses. One type of prior art system utilizes the principle of rotating disks, one for output and one for input. A predetermined misalignment between the two disks traps a ball in such a way that its rotation transfers motion from one disk to the other. Infinitely variable speed changes are accomplished by moving the ball up or down between the disks.

In a similar prior art system, a rotating disk, which is attached to an input shaft, and a roller axially surrounding an output shaft are each touched by a ball disposed between them, whose position may be varied to alter the speed of the roller, and the output shaft thereby.

A different type prior art system produces a change in speed by slowing down the input by use of a number of sprague clutches. In this system the degree of dampening is controlled by the amount of friction applied between the sprague clutches and the input shaft.

Yet a fourth type of variable rotational speed transmission device utilizes a spool and pulley system for infinitely variable speed control.

Each of the prior art systems has one or more debilitating disadvantages which would severely limit its use to a relatively small number of applications. In the prior art system based on the principle of misaligned rotating disks, there is no way to increase the mechanical advantage or horsepower of the output. A further disadvantage is that transmission of power is provided by a single ball, which contacts each disk at one point only. Since there is only a very small amount of frictional contact between the functional elements, the amount of horsepower which the system can transmit is quite limited. A further disadvantage is that the device may not be preset while stopped.

Prior art systems utilizing a rotating disk, a roller, and a ball also have similar inherent frictional deficiencies, which prevent use of this type of device for anything more than very small horsepower transmission. Also there is no way to increase horsepower. A further disadvantage is that output speeds may not be decreased below 50 r.p.m. without a dramatic loss in torque, and such a device may not be preset while stopped.

Prior art systems utilizing frictional clutches have the disadvantage of being noisy during operation. Also, due to the great friction involved, such systems must be operated while submerged in an oil atmosphere, which adds to the cost of the housing and could cause damage to objects in the immediate vicinity of the device if the oil-tight outer casing should break. Frequent prophylactic maintenance would be necessary to operate such a system safely. Also the number and shape of the functional parts make its initial cost relatively high. A further disadvantage is that it may not be accurately preset while stopped. However, perhaps its most severe limitation is that the input may not be increased in rotational speed, but may only be dampened, due to the clutch principle of operation.

Although spool and pulley systems have sufficient frictional contact between elements to handle the larger horsepower requirements often needed, they too have a number of disadvantages. Their startup and operation may be jerky and unreliable due to stretching of pulley belts. Also it is impossible to preset these machines for a specific rotational output speed when the device is not in operation, and they frequently must be recalibrated due to stretching of pulley belts.

The disadvantages of prior art devices have limited the use of any particular type of system to a relatively small number of applications. A practical infinitely variable rotational speed transmission device should be sufficiently versatile to be manufactured materials for a wide variety of applications.

SUMMARY OF THE PRESENT INVENTION

The present invention provides an infinitely variable rotational speed transmitting device which may be manufactured in a great variety of sizes of various materials for application in virtually any situation where variable rotational speed control is needed.

The present invention utilizes an input shaft and an output shaft with spring urged conical disks mounted axially thereon. Facing these conical disks are similarly shaped conical disks mounted on similar, axially aligned shafts. Pinched in between these conical disks by compression coil springs, urging the pairs of facing conical disks together, is an idler disk mounted on a centrally disposed idler way support.

Rotational movement is transferred from the input shaft to the driving conical disk mounted thereon. A cylindrical gear transmits the rotational motion to a facing driving conical disk. Both driving conical disks then transmit rotational motion to the idler disk, which in turn transmits such motion to the driven conical disks and, thereby, the output shaft. The resulting output rotational speed is varied by moving tthe idler disk backward or forward between the driving pair of disks and the driven pair of disks. For this purpose a control lever assembly is connected to the ends of the centrally disposed idler way support and is used to slide the way support and, consequently, the entire idler disk to a different position, which changes the resulting output speed. When the idler disk is positioned near the apex of the conical surface of the driving disk, a single rotation of the input shaft will result in a very small amount of rotation of the idler disk, and consequently the driven disk and output shaft will also be rotated only a very small amount.

The problems associated with infinitely variable speed ratio changers of the prior art have been considerably lessened by use of the present invention. The present invention has all the advantages of prior art devices and suffers very few, if any, of their disadvantages. While other devices may not be used efficiently at low r.p.m., the present invention provides an effective minimum rotational output of virtually dead zero.

In contrast to prior art devices which were often costly manufacture, due to the large number of functional elements or relatively complicated shape of the components or other special engineering occasioned by the design of a particular apparatus, the present invention is relatively low in cost to manufacture. It has fewer moving parts than many prior art devices, which also results in lower maintenance costs. In addition, depending on whether the application of the present invention is for use in precision instruments or inexpensive toys, the parts may be manufactured from a wide variety of materials. It is compact in size, where many prior art devices are bulky. It starts and operates smoothly and is relatively noise free. The output speed may be increased as easily as decreased. Another advantage over the prior art is the fact that the output horsepower may be increased by stacking units and extending the cylindrical gearing to mesh with the gear teeth on the conical deiving and driven disks of the stacked devices.

The present invention can transmit considerably larger input horsepower than prior art devices. A further advantage is that it may be calibrated for presetting while the apparatus is stopped, reproducibility of output speed being good thereafter. Also advantageous for many applications of the present invention is the fact that the output speed is controlled by lever means, which makes for ease of remote control where needed.

A further advantage is that wear of functional parts does not affect the usefulness of the present invention since wear of the frictional surfaces is largely self-compensating. Furthermore, the present invention may be easily recalibrated if need be. In addition, the input and output shafts may be optionally located to fit the needs of the particular use made of the present invention. The combination of the above features and advantages of the present invention serve considerably to lessen many of the problems of the prior art.

Other features and advantages are inherent in the present invention as disclosed and claimed, or will become apparent to those skilled in the art from the following detailed description in conjunction with the accompanying drawings.

DETAILED DESCRIPTION OF THE DRAWING

Figure 1:
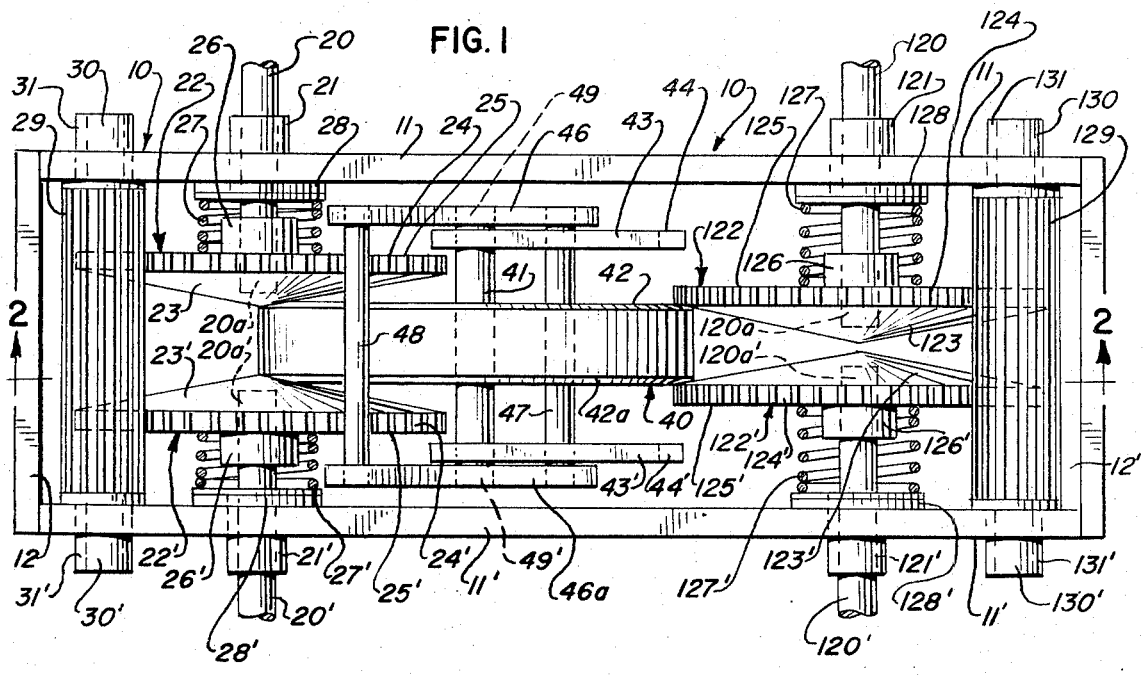
FIG. 1 is a plan view with the top plate removed showing the functional elements of the present invention.
Figure 2:
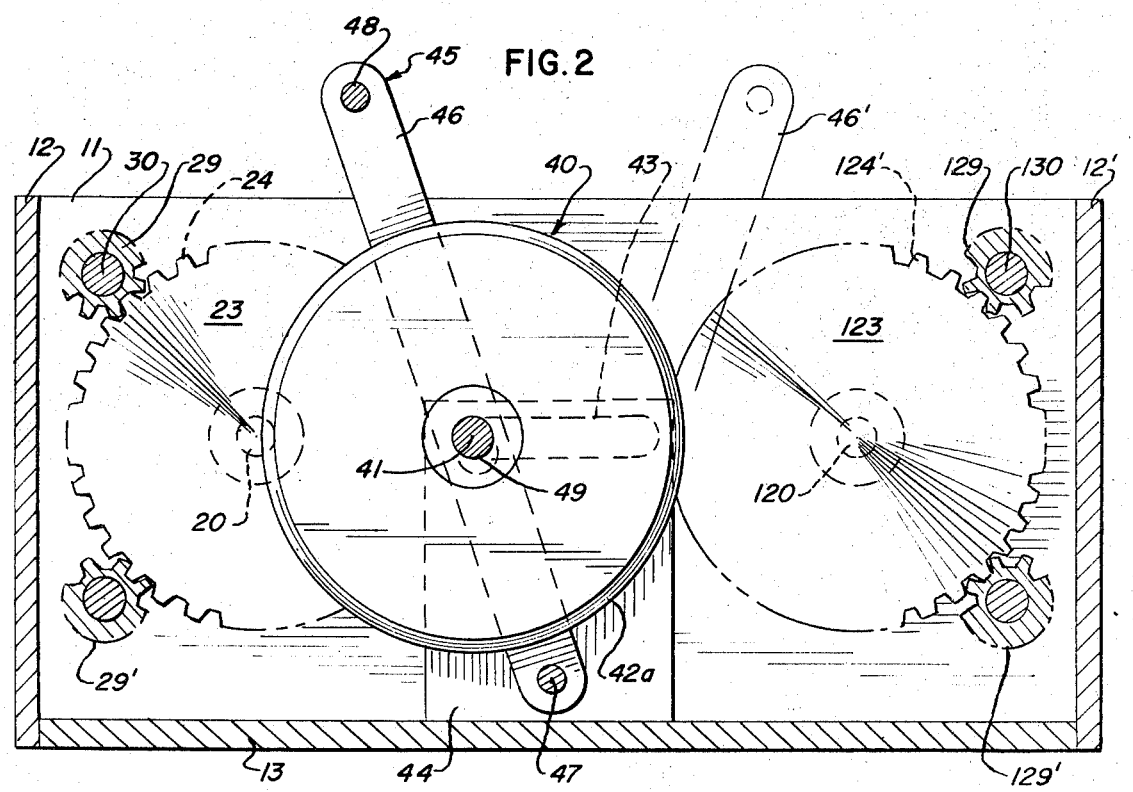
FIG. 2 is a side view, taken along sectional lines 2—2 of FIG. 1, showing the present invention in minimum speed position, also showing the control lever in phantom lines moved to the maximum speed position.

Referring to FIGS. 1 and 2 and using common numbering for similar elements, the present invention is surrounded by a metal housing 10. Housing 10, which may be die cast, comprises side plates 11, 11', end plates 12, 12', a bottom plate 13, and a top plate 14 (not shown).

For purposes of this description the various parts of the present invention may be divided into three main functional groups: a) the driving elements; b) the driven elements; and c) the transmitting element which connects a) and b).

The driving mechanism of the present invention has input shaft 20 and alternate input shaft 20', which enter housing 10 through proper sized openings in side plates 11, 11'. Shafts 20, 20' are axially aligned and perpendicular to side plates 11, 11'. Surrounding shafts 20, 20' at the point of entry are sealed lifetime bearings 21, 21'.

Firmly attached to the ends of shafts 20, 20' are identically shaped conical driving disks 22, 22', which face each other in parallel disposition. Conical driving disks 22, 22' have cone-shaped frictional surfaces 23, 23'. Near the base of each cone, driving disks 22, 22' have ring gears 24, 24' which are cut perpendicular to planar base surfaces 25, 25' of driving disks 22, 22'.

At the center of planar base surfaces 25, 25' are sleeves 26, 26' which surround ends 20a 20a' of shafts 20, 20'. Ends 20a, 20a' are inserted into the cylindrical holes of sleeves 26, 26' such that shafts 20, 20' are perpendicular to planar base surfaces 25, 25'. Sleeves 26, 26' are not firmly attached to the driving disks and slide freely on shafts 20, 20'.

Axially disposed along shafts 20, 20' are compression coil springs 27, 27', which urge driving disks 22, 22' towards each other. Disposed between compression coil springs 27, 27' and side plates 11, 11' are thrust bearings 28, 28'. Nearest side plate 12 in either the top corner or the bottom corner and meshing with ring gears 24, 24' of conical driving disks 22, 22' is cylindrical power transmitting gear 29, or alternatively located gear 29'. Cylindrical power transmitting gear 29, whose rotational axis is parallel to that of shafts 20, 20', is supported on either end by gear shafts 30, 30', which are free to rotate within sealed lifetime bearings 31, 31', which are in turn supported by side plates 11, 11'.

The driven mechanism of the present invention has output shaft 120 and optional output shaft 120', which enter housing 10 through proper sized openings in side plates 11, 11'.

Shafts 120, 120' are axially aligned and surrounded at the point of entry by lifetime bearings 121, 121'.

Firmly attached to the ends of shafts 120, 120' are identically by shaped conical driven disks 122, 122', which face each other in parallel disposition. Conical driven disks 122, 122' house cone-shaped frictional surfaces 123, 123'. Near the base of each cone, driven disks 122, 122' have ring gears 124, 124', which are cut perpendicular to planar base surfaces 125, 125' of driven disks 122, 122'. At the center of planar base surfaces 125, 125' are sleeves 126, 126' which surround ends 120a, 120a' of shafts 120, 120'. Ends 120, 120a' are inserted into the cylindrical holes of sleeves 126, 126' such that shafts 120, 120' are perpendicular to planar base surfaces 125, 125'. Sleeves 126, 126' are not firmly attached to the driven disks and slide freely on shafts 120, 120'.

Axially disposed along shafts 120, 120' are compression coil springs 127, 127', which urge driven disks 122, 122' towards each other. Disposed between compression coil springs 127, 127' and side plates 11, 11' are thrust bearings 128, 128'. Nearest side plate 12 in either the top corner or the bottom corner and meshing with ring gears 124, 124' of conical driven disks 122, 122' is cylindrical power transmitting gear 129, or alternatively located gear 129'. Cylindrical power transmitting gear 129, whose rotational axis is parallel to that of shafts 120, 120', is supported on either end by gear shafts 130, 130', which are free to rotate within sealed lifetime bearings 131, 131', which are in turn supported by side plates 11, 11'.

Frictionally disposed between the pairs of conical disks is the transmission of the present invention, an idler disk 40, which is supported by a movable, centrally disposed idler way support 41, which is also supported by lifetime bearings. Idler disk 40 has beveled circumferential edges 42, 42a, which make frictional contact with input conical disk frictional surfaces 23, 23' and output conical disk frictional surfaces 123, 123'. The angle of the bevel of circumferential edges 42, 42a is the same as the angle, e.g., between planar base surface 25 and frictional surface 23 of driving disk 22 — about 10° in the embodiment shown.

The ends of idler way support 41 are slidably mounted within slots 43, 43' of idler way support guides 44, 44', which are disposed immediately internal to side plates 11, 11' and are perpendicularly secured to and supported by bottom plate 13.

The position of idler disk 40 between driving disks 22, 22' and driven disks 122, 122' is changed by means of lever assembly 45, which comprises two slotted lever bars 46, 46a, a pivot shaft 47, and a handle 48.

Lever bars 46, 46a, which are disposed immediately exterior to idler way support guides 44, 44', pivot arcuately around pivot shaft 47 when lever assembly 45 is moved from the minimum speed position shown in the FIGS. to the maximum speed position schematically represented by lever bar 46' (shown in phantom lines in FIG. 2). Lever bars 46, 46a have enlarged apertures 49, 49' which permit lever assembly 45 to change positions. When idler way support 41 slides forward or backward within slots 43, 43' of idler way support guides 44, 44', due to the arcuate character of the movement of lever bars 46, 46a, way support 41 as a result also slides vertically within apertures 49, 49'.

Rotational motion is transferred from input shaft 20 to output shaft 120 by means of idler disk 40. When input shaft 20 is rotated, conical driving disk 22, being firmly attached at end 20a, of input shaft 20, is likewise rotated.

Ring gear 24 transmits the rotational motion to cylinrical gear 29, which, since it is also meshed with ring gear 24' of conical disk 22', transmits the rotational motion to disk 22'.

Beveled circumferential edges 42, 42' of idler disk 40 are urged into contact with frictional surfaces 23, 23' respectively by compression coil springs 27, 27', which are axially disposed along shafts 20, 20' respectively. Idler disk 40 or the various conical disks may be made of magnetic material for greater gripping contact between their surfaces.

Way support 41, being disposed through a central hole in idler disk 40 perpendicular to the planar surfaces of idler disk 40, is free to rotate about way support 41.

Diametrically across idler disk 40 from the points of contact of paired driving conical disks 22, 22' with edges 42, 42a of idler disk 40, frictional surfaces 123, 123' of paired driven conical disks 122, 122' are similarly in contact with beveled circumferential edges 42, 42a of idler disk 40.

Since conical disks 122, 122' also are firmly attached perpendicularly to shafts 120, 120', the rotational motion of conical disks 122, 122' is transmitted to shafts 120, 120'. Just as with the driving conical disks, compression coil springs 127, 127' are axially disposed along shafts 120, 120' to urge frictional surfaces 123, 123' of conical disks 122, 122' into intimate contact with beveled circumferential edges 42, 42a of idler disk 40. Cylindrical gear 129 serves the function of transmitting rotational motion from one driven conical disk to the other to permit the apparatus to transmit a greater amount of horsepower.

The output speed may be infinitely varied depending on the position of idler disk 40 between driving disks 22, 22' and driven disks 122, 122'. When idler disk 40 is in the position shown in FIGS. 1 and 2, the rotational speed of output shaft 120 is at a minimum. The reason for this is that for each complete rotation of input shaft 20, idler disk 40, contacting frictional surfaces 23, 23' very near the apeces of their respective cones, will rotate only a few degrees. Since idler disk 40 is in contact with frictional surfaces 123, 123' very near the base of their respective cones, a rotation of a few degrees by idler disk 40 will result in a similar rotation of disks 122, 122' of also only a few degrees. Based on these principles, if it is desired to increase the rotational output speed, idler disk 40 only need be moved more toward the bases of the cones of disks 22, 22' and the apeces of the cones of output disks 122, 122', and as a consequence more away from the apeces of the cones of disks 22, 22' and more away from the bases of the cones of disks 122, 122'.

The present invention may be manufactured from a wide variety of metals, plastics, and other materials depending on the size of the power source to be transmitted, the expense warranted by the application, and the durability required.

The foregoing detailed description has been given for clearness of understanding only, and no unnecessary limitations are to be understood therefrom, as modifications will be obvious to those skilled in the art.

What is claimed is:

1. An infinitely variable rotational speed transmitting device comprising:
   first and second conical driving disks mounted for rotational movement aligned on a first common axis;
   first and second conical driven disks mounted for rotational movement aligned on a second common axis parallelly disposed to said first common axis;
   first input shaft rotationally mounting said first conical driving disk;
   second input shaft rotationally mounting said second conical driving disk;
   first output shaft rotationally mounting said first output shaft;
   second output shaft rotationally mounting said second output shaft;
   respective compression means for urging said driving conical disks and said driven conical disks together along the respective axes of their rotation; and
   idler disk means including an idler disk and means for engaging operatively said idler disk to said driving and driven conical disks to transmit power at infinitely variable speeds between said driving conical disks and said driven conical disks.

2. An apparatus as claimed in claim 1 wherein:
   said compression means comprise respective compression coil springs axially mounted about said first input shaft, said second input shaft, said first output shaft, and said second output shaft.

3. An apparatus as claimed in claim 2 including:

opposite circumferential beveled edges in said peripheral portion frictionally engageable with said conical driving and driven disks;

idler disk moving means for moving said idler disk towards said conical driving disks for compressing said respective compression coil springs to move said respective circumferential beveled edges engaging said driving disks towards said first common axis and simultaneously moving said idler disk away from said common axis to enable said driven disks to engage said circumferential beveled edges, thereby decreasing the rotational speed of said driven disks.

4. An apparatus as claimed in claim 3 wherein said idler disk moving means includes:

means for moving said idler disk toward said conical driven disks for compressing said respective compression coil springs to move said respective circumferential beveled edges engaging said driven disks towards said second common axis and simultaneously moving said idler disk away from said first common axis to enable said driving disks to engage said circumferential beveled edges, thereby increasing the rotational speed of said driven disks.

5. An infinitely variable rotational speed transmitting device comprising:

first and second conical driving disks mounted for rotational movement aligned on a first common axis;

first and second conical driven disks mounted for rotational movement aligned on a second common axis parallelly disposed to said first common axis;

respective gear means including a ring gear associated with each of said conical driving and driven disks;

a driving coupling gear in meshing engagement with both ring gears of said driving conical disks;

a driven coupling gear in meshing engagement with both ring gears of said driven conical disks;

respective compression means for urging said driving conical disks and said driven conical disks together along the respective axes of their rotation; and idler disk means including an idler disk and means for engaging operatively said idler disk to said driving and driven conical disks to transmit power at infinitely variable speeds between said driving conical disks and said driven conical disks.

6. An apparatus as claimed in claim 5, including:

means for coupling power to one of said driving disks for transmitting power from said driving gear through said driving coupling gear to the other of said driving disks.

* * * * *